Feb. 3, 1942.  J. E. TRAINER  2,271,723
APPARATUS FOR ARC WELDING
Original Filed June 16, 1934   7 Sheets-Sheet 1

Fig. 1

INVENTOR.
James E. Trainer
BY
ATTORNEY.

Feb. 3, 1942. J. E. TRAINER 2,271,723
APPARATUS FOR ARC WELDING
Original Filed June 16, 1934 7 Sheets-Sheet 2

INVENTOR.
James E. Trainer
ATTORNEY.

Feb. 3, 1942. J. E. TRAINER 2,271,723
APPARATUS FOR ARC WELDING
Original Filed June 16, 1934 7 Sheets-Sheet 3

INVENTOR.
James E. Trainer
ATTORNEY.

Feb. 3, 1942.   J. E. TRAINER   2,271,723
APPARATUS FOR ARC WELDING
Original Filed June 16, 1934   7 Sheets-Sheet 4

INVENTOR.
James E. Trainer
BY
ATTORNEY.

Feb. 3, 1942.    J. E. TRAINER    2,271,723
APPARATUS FOR ARC WELDING
Original Filed June 16, 1934    7 Sheets-Sheet 5

INVENTOR.
James E. Trainer
ATTORNEY.

Feb. 3, 1942. J. E. TRAINER 2,271,723
APPARATUS FOR ARC WELDING
Original Filed June 16, 1934 7 Sheets-Sheet 6

Fig. 13

INVENTOR.
James E. Trainer
BY
ATTORNEY.

Patented Feb. 3, 1942

2,271,723

UNITED STATES PATENT OFFICE 2,271,723

APPARATUS FOR ARC WELDING

James E. Trainer, Fairlawn, Ohio, assignor to The Babcock & Wilcox Company, Newark, N. J., a corporation of New Jersey Original application June 16, 1934, Serial No. 730,852. Divided and this application October 25, 1938, Serial No. 236,844

20 Claims. (Cl. 219—8)

This invention relates to welding machines and more particularly to that class adapted to utilize the electric arc and in which a bare, coated or covered weldrod may be progressively fed to the weld.

An object of the invention is to provide a machine of the class mentioned so arranged that a weldrod feeding head is movable longitudinally of the work seam being welded, and yet is adapted for operation in a stationary position with the work seam movable relative thereto, whereby the same machine and weldrod feeding head may be utilized for either longitudinal or circumferential seam welding.

A further feature is the provision of a weldrod feeding head having an adjustment of the weldrod feeding device itself with relation to the same, in addition to the movement mentioned in the preceding paragraph and which thus renders it possible for the operator to exactly position the end of the weldrod with respect to the width dimensions of the seam.

The weldrod feeding head is also so constructed that the angularity of the rod with respect to the work seam may be adjusted in planes at right angles to each other to provide the proper weldrod inclination for the type of seam being worked upon, whether it be either a longitudinal, transverse or a circumferential seam.

Another important feature of the invention is the feeding of the weldrod with feeding rollers having a resiliently yielding frictional engagement with the weldrod and normally automatically operated for a rate of feed suitable for the type of work and materials used, but having a manual adjustment independent of the automatic feed.

The form of weldrod preferably used is that disclosed in the patent to applicant 2,057,861, dated October 20, 1936, wherein the weldrod is coated and the metallic core is formed with spaced projections which extend at least through the coating to provide for electrical contact.

If desirable, the machine, as used for circumferential and longitudinal welds on tank bodies, penstocks and the like, may include a backing-up member or a chill which is stationary for circumferential seams, while the work moves through a suitable work drive, but which may be moved longitudinally of the work seam coincidentally with the weldrod feeding head when the work being operated upon is, itself, stationary.

The welding machine is operated in conjunction with suitable welding current and control circuits such as disclosed in the copending application, Serial No. 730,852, filed June 16, 1934, which has matured into Patent 2,135,129, of which the present application is a division. Manual adjustment is provided for varying and setting the rate of automatic feed, as well as an automatically actuated adjustment of the automatic feed verying the latter in accordance with conditions at the arc, or more broadly stated in accordance with conditions in the welding zone; the welding current circuit and the welding current and weldrod feed control circuits, coordinated and cooperating for control of the conditions in the welding zone, providing a system which is especially adapted for the utilization of alternating current at the arc.

With the foregoing features stated the invention will now be described in connection with the accompanying drawings illustrating a practical form of the same and wherein:

Fig. 10 is a sectional view on the line 10—10 of Fig. 9 showing the upper rollers in place and operatively engaging the weldrod, this arrangement being the one used for welding circumferential seams;

Fig. 11 is a sectional view on the line 11—11 of

Fig. 9 and showing the lower rollers in place and operatively engaging the weldrod, this arrangement being the one used for welding longitudinal seams;

Fig. 12 is a sectional view on line 12—12 of Fig. 10;

Figure 1:
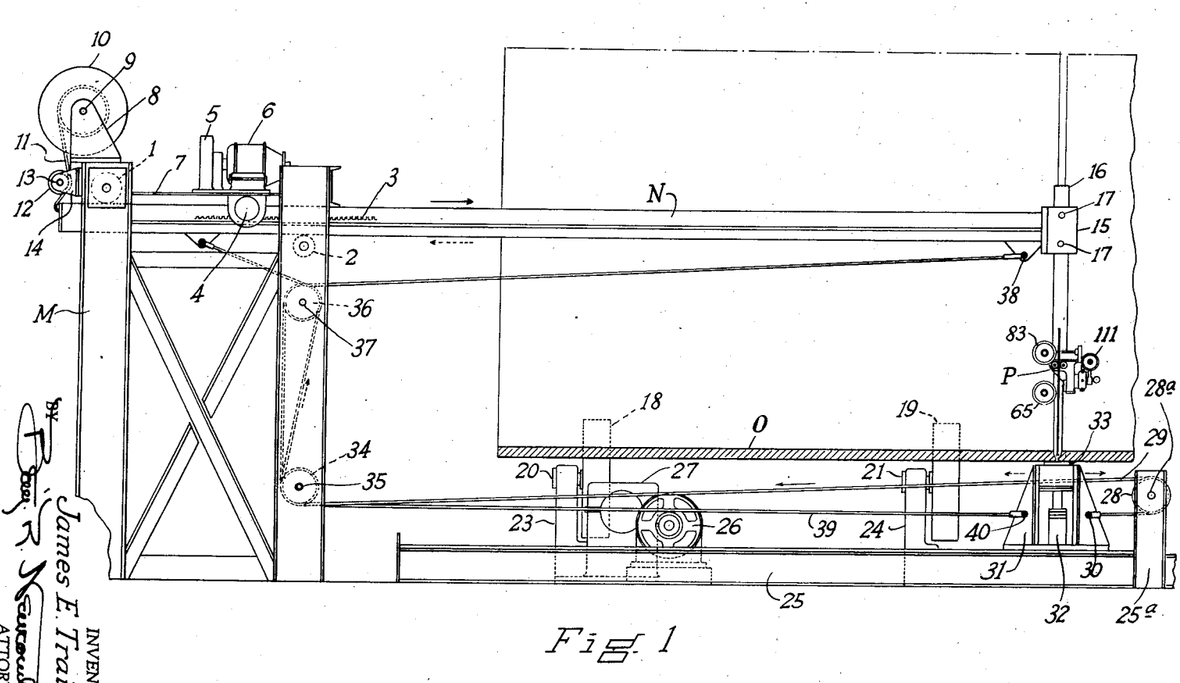
Fig. 1 is a side elevation of the machine as adapted to the welding of a circumferential seam in a tank body, penstock unit or the like, with the elements being worked upon shown in section.
Figure 2:
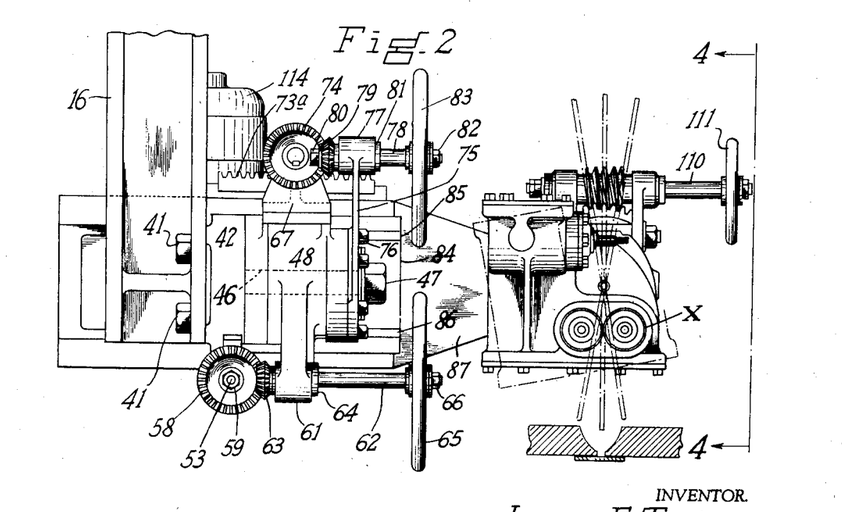
Fig. 2 is an enlarged side elevation of my improved form of weldrod feeding head showing the latter as welding a longitudinal seam.

In detail:

With reference to Fig. 1, an upright frame M, suitably constructed, preferably from structural steel members, has guided therein, for longitudinal movement only, a horizontal beam N moving on the roller bearing members 1 and 2 carried by the frame M.

The horizontal beam N carries a longitudinally disposed rack 3 engaged by a pinion drive 4 driven through suitable reduction gearing 5 from the electric motor 6 mounted on base 7 stationary with the frame M.

For carrying electric current to the weldrod feeding head to be hereinafter described, brackets 8 on frame M support shaft 9 and the latter carries reel 10 on which is coiled the multiconductor cable 11 passing over the guiding idler roll 12 journaled on shaft 13 supported in brackets 14 also mounted on frame M; the conductor cable 11 is led along the beam N to the vertical guideway 15 at the end thereof and in which is the independent vertically adjustable column 16 held in position by locking screws 17.

The work to be operated upon is indicated at O as a cylindrical member in Fig. 1, and rests upon longitudinally spaced pairs of rollers 18 and 19 (only one of each pair being shown) suitably journaled as indicated at 20 and 21, respectively, upon stanchions 23 and 24 which are adjustable along a bed member 25; a motor 26, through appropriate reduction gearing 27 may drive one or more rollers of the pairs of rollers 18 or 19 for the purpose of moving the work past the weldrod when a circumferential weld is being accomplished, the movement of beam N taking care of longitudinal welds.

Centrally of the transverse dimension of the bed 25 is an upright 25ª carrying a shaft 28ª on which is journaled an idler 28. A cable 29 passes over the idler 28 and one end 30 of the cable is connected to a longitudinally sliding backing-up member 31 having an adjusting jack 32 engaging a weld seam backing-up strip 33 to assist in supporting the same against the weld seam boundaries; the other end of the cable 29 is passed under one of a group of idlers 34 journaled on shaft 35 and mounted in frame M, thence over one of a group of idlers 36 journaled on shaft 37 mounted in frame M and attached, as at 38, to the forward portion of beam N; similarly, one end of cable 39 is attached, as at 40, to the opposite side of backing-up member 31 from the attachment of cable 29 and passes under its idler section 34, thence over its particular idler section 36 and is secured to the after end of beam N.

With the arrangement described in the foregoing paragraph it will be observed that movement of beam N effects a corresponding movement of backing-up member 31, and thus the weldrod and backing-up member are always automatically maintained in proper relative position for cooperation, either for a longitudinal, circumferential or transverse seam.

The weldrod feeding head is generally indicated in Fig. 1 by the letter P and is mounted at the lower end of the upright column 16 carried by the front end of beam N to which it is secured by suitable studs or bolts 41 passing through the column 16 and entering the bracket 42 which has secured thereto a sector piece 43 held against displacement by bolts or studs 44 and key 45.

I refer now to Figs. 2, 3, 4, 5, 6, 7, 8, 9, 11 and 13 which show the details of my improved form of adjustable head, and the adjustment used for welding longitudinal seams.

A journal pin 46 is integral with or secured to the bracket 42 and extends outwardly therefrom at right angles, and is provided with a threaded member, such as either a stud or nut 47, at its outer end for purposes of retaining the elements hereinafter described in their assembled relation with respect to journal pin 46 and bracket 42.

Mounted upon journal pin 46 is the movable frame 48, the lower portion of which is provided with bearings 49 and 50 (see Fig. 6), with bushings as shown, and between which is received the worm gear 51 meshing with the teeth of sector 43; the worm gear 51 is secured by a key 52 to the shaft 53 turning in the bushings of bearings 49 and 50, the shaft 53 being held at one end against longitudinal displacement by the nut 54 and washer 56 on the threaded extension 55, while the other end has keyed thereto, as at 57, the bevel gear 58 secured in place by the nut 59 on the threaded extension 60 of said shaft 53.

The frame 48 of the weldrod feeding head also has integral therewith a bracket bearing 61 which journals shaft 62 secured against longitudinal movement by the bevel gear 63 fixed thereto and engaging bevel gear 58 and by collar 64; on the end of shaft 62 opposite bevel gear 63 is a handwheel 65 held by a key (not shown) and nut 66.

It will be obvious from the foregoing description relative to the mounting of the weldrod feeding head frame 48 on the journal pin 46 that movement of the handwheel 65 will displace the said frame 48 angularly by reason of the meshing bevel gears 58 and 63 which rotate shaft 53 and its worm 51, which latter engages the fixed sector 43; the object of such angular displacement of the welding head frame is to vary the angularity of the weldrod in one vertical plane, as will appear as this description proceeds.

Figure 3:
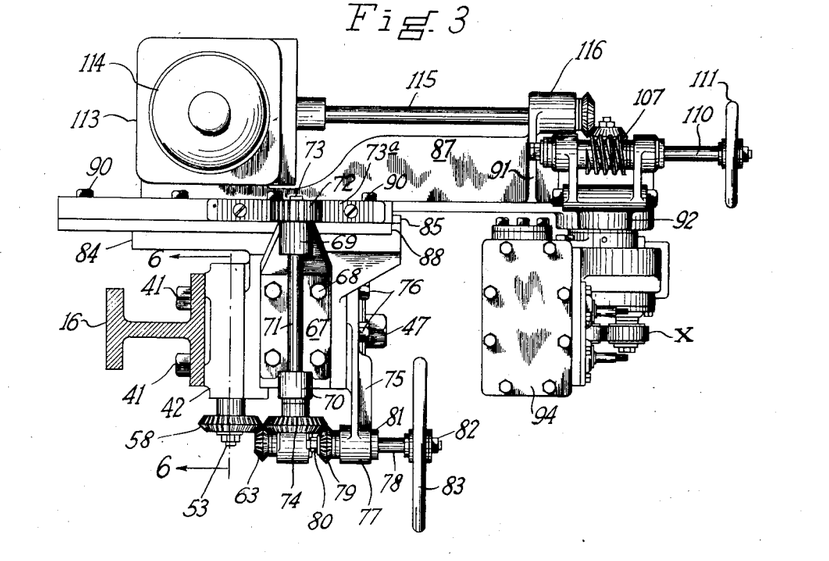
Fig. 3 is a top plan view of the weldrod feeding head shown in Fig. 2.

On the top of the weldrod feeding head frame 48 is a bracket 67 secured by bolts 68 and having bearings 69 and 70 receiving the shaft 71 which, at one end, has keyed thereto a pinion 72 secured by nut 73 and engaging a rack 73ª carried by frame 87, and at the other end bevel gear 74 is keyed and secured to the said shaft 71 (see Fig. 3). A bracket 75 held to the frame 48 by bolts 76 carries a bearing 77 journaling a shaft 78 having keyed and secured thereto a bevel gear 79 meshing with bevel gear 74 on shaft 71, end play of shaft 78 being prevented by nut 80 and collar 81; said shaft 78 has a handwheel 83 secured thereto and held thereon by a nut 82.

Figure 4:
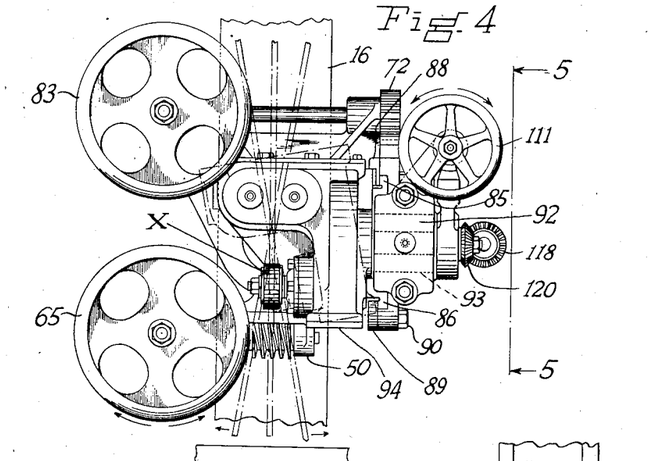
Fig. 4 is an end elevation in the direction of the arrow 4—4 of Fig. 2.
Figure 5:
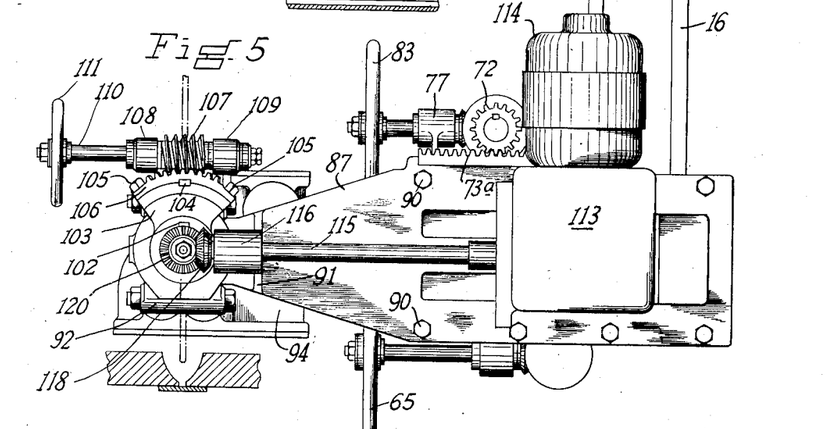
Fig. 5 is a side elevation of the weldrod feeding head as shown in Fig. 4 and in the direction of the arrows 5—5 of Fig. 4 or, in other words, this view is of the opposite side from that shown in Fig. 2.
Figure 6:
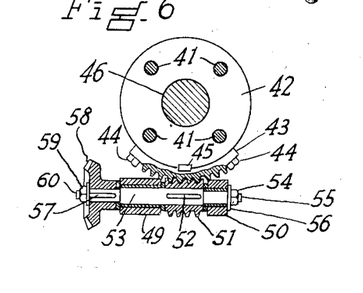
Fig. 6 is a sectional view on the line 6—6 of Fig. 3.
Figure 7:
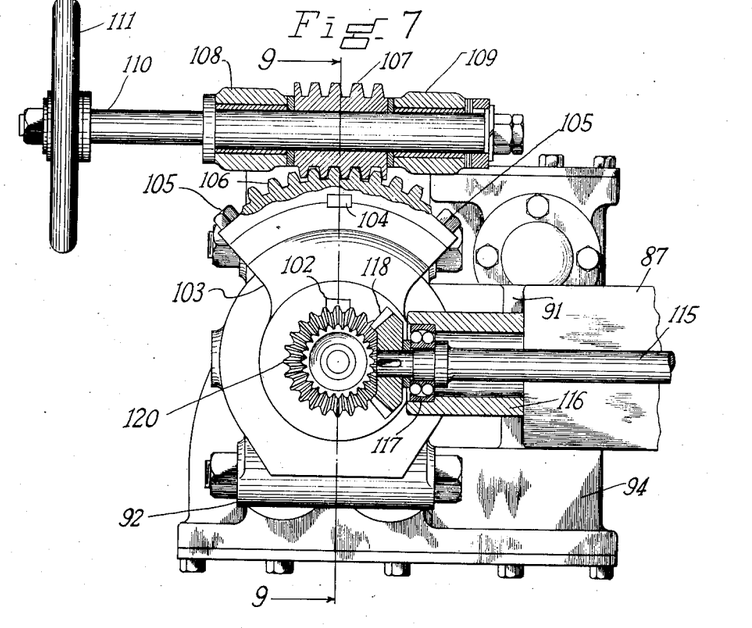
Fig. 7 is an enlarged view, partly in section and in side elevation, of the angular adjustment for the weldrod in one plane, as also shown in Figs. 2 and 5.
Figure 8:
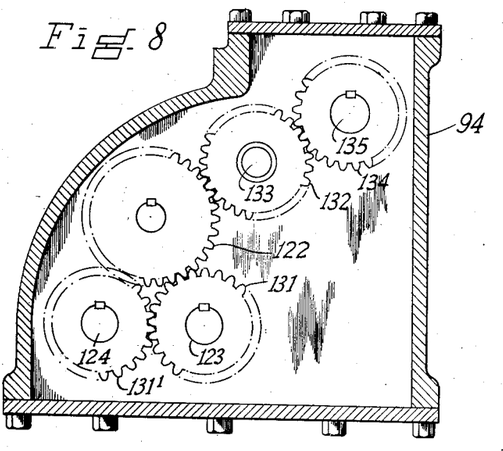
Fig. 8 is a sectional view, in side elevation, of the gear box shown in Fig. 7.
Figure 9:
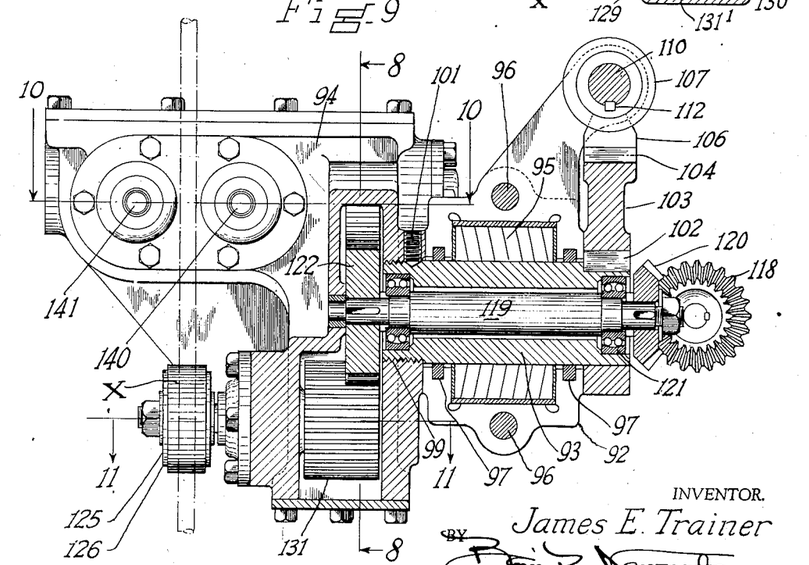
Fig. 9 is a part sectional and elevational view in the direction of the arrows 9—9 shown in Fig. 7.

In an upright plane at the side of frame 48 is the guide member 84 fixed with respect to the said frame 48 and having laterally extending parallel guide surfaces 85 and 86 upon which the movably mounted member 87 slides, the elements 88 and 89 being secured to member 87 and overlapping guide surfaces 85 and 86 as shown in Fig. 4 and held in place by bolts or studs 90.

It will thus be evident that with the mounting above described, and the pinion and rack arrangement as set forth, motion of the handwheel 83 will move the weldrod feed and adjusting mechanism lineally.

Thus far there are three movements described, firstly, the movement of the entire welding head P through travel of the beam N, secondly, the angling movement of the weldrod feed and adjusting mechanism in the plane of movement of the entire welding head, this being accomplished by the handwheel 65; and thirdly, movement of the weldrod feed and adjusting mechanism lineally in a plane transverse to the movement accomplished by travel of beam N, but such movement by handwheel 83 is purely local for adjusting purposes with respect to the welding groove.

The weldrod feed and adjusting mechanism has also another movement and that is angular movement in a plane of movement coinciding with the plane of movement by handwheel 83.

Figures 10, 11, 12:
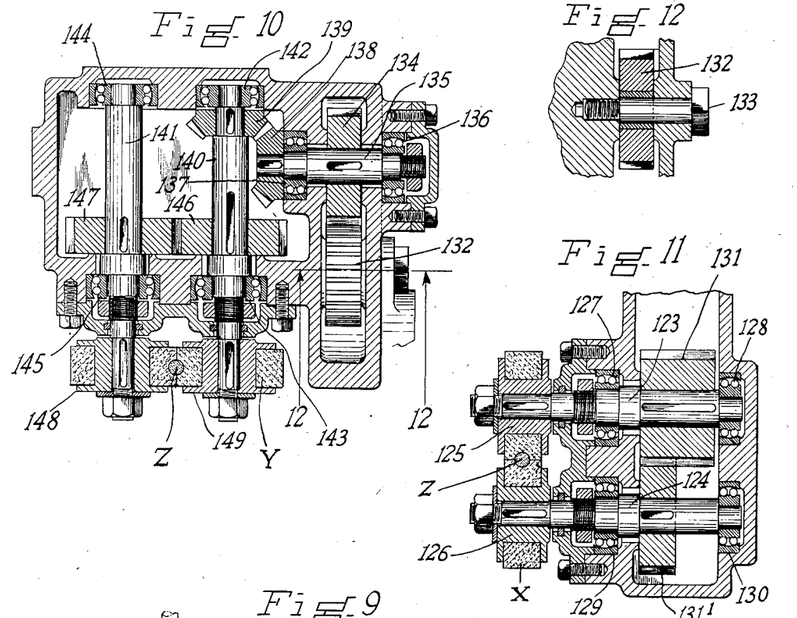
Figure 13:
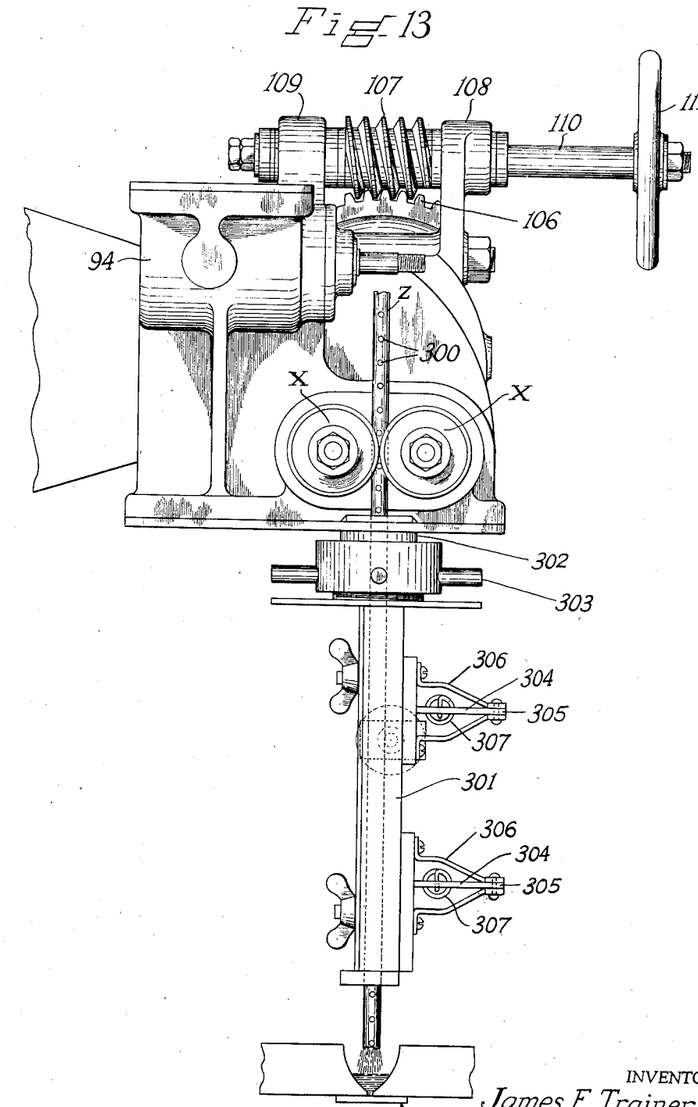
Fig. 13 is a fragmentary enlarged side elevation of the weldrod feeding head with the weldrod shown as being engaged by the lower set of rollers and including the contact shoes for conducting the welding current to the rod, this arrangement being the one used for welding longitudinal seams.
Figure 14:
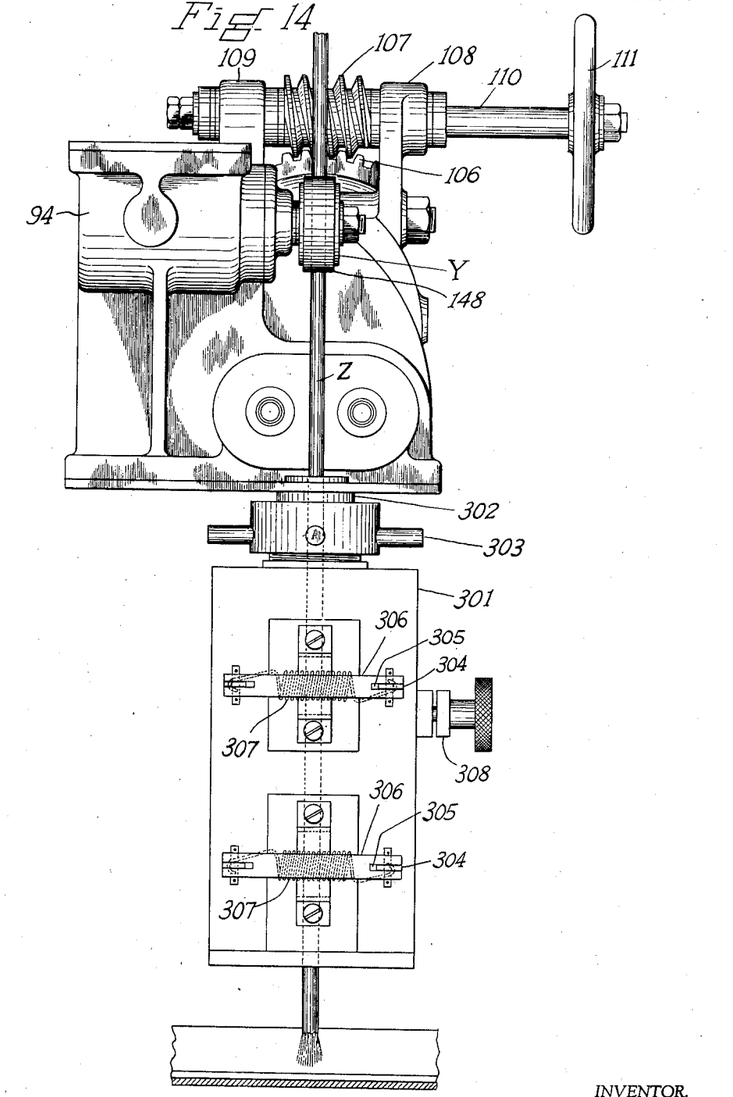
Fig. 14 is a view similar to Fig. 13 showing the alternative arrangement of the upper rollers engaging the rod for welding circumferential seams, and the electrical contact shoes turned at right angles to the position shown in Fig. 13.

The movably mounted member 87 is formed at its outer end 91 so that it provides a transverse journal bearing 92, as shown in Figs. 4, 5, 7 and 9, having its axis intersecting the axis of journal pin 46 and receiving the pintle 93 of the gear housing 94 for the gears driving the weldrod feeding rollers arranged in pairs X and Y at right angles to each other, the pair X being shown in Figs. 2, 3, 4, 9, 11 and 13 and for the purpose of feeding the weldrod while welding a longitudinal seam, and the pair Y being shown in Figs. 1, 10, and 14 and being for the purpose of feeding the weldrod while welding a circumferential seam. Thus, when using a weldrod according to Patent 2,057,861 and selecting a pair of rollers X or Y, according to the seam to be welded, the contact projections on the weldrod may be aligned in the plane of the welding groove, parallel to the axes of the rollers, and remote from the sides of the groove.

The cap of the journal bearing 92 is recessed, as is also the outer end 91 of member 87 to accommodate a roller or frictionless bearing 95 and the whole is held in assembled relation by bolts or studs 96, felt or other grease retaining rings 97 being located on each side of said bearing 95.

Extending through the bearing 95 is pintle 93 in the form of a sleeve threaded at one end into a gear casing 94 as shown at 99, said casing supporting and carrying the pairs of weldrod feeding rollers X and Y above mentioned. The sleeve 93 is prevented from working out by the set screw 101. At the end opposite the threaded portion 99 of the sleeve 93 is keyed, as at 102, the sector member 103 which also has keyed and bolted thereto as at 104 and 105, respectively, the rack 106. The rack 106 is engaged by a worm 107 confined between bearings 108 and 109 of the member 87 which mount spindle 110 of handwheel 111 and to which spindle worm 107 is keyed, as at 112, so that motion of the handwheel 111 serves to tilt or angle gear case 94 and with it the electrode or weldrod.

Mounted at the side of member 87 is a reduction gear housing 113 surmounted by a vertically positioned electric driving motor 114 which is reversible and drives the horizontal shaft 115 through the medium of the reducing gear in housing 113 and which may be of any usual commercial type of the proper ratio and affording a right angle drive.

The outer end of shaft 115 passes through bearing support 116 carrying the ball bearing 117 and has keyed thereto the bevel pinion 118 meshing with a similar bevel pinion 120 keyed to stub shaft 119 and held thereon by a nut, said stub shaft 119 passing through ball bearings 121 in the sleeve 93 and the end opposite bevel pinion 118 carries a spur gear 122 keyed thereto and which by a system of spur gears to be hereinafter described, serves to drive the pairs of electrode or weldrod feeding rollers X and Y.

As stated, in case it is desired to weld a longitudinal seam the pair of rollers X is used. The pair of feed rollers X are mounted on stub shafts 123 and 124 which, respectively, carry feed rollers 125 and 126 of the pair X keyed thereto as shown, the rollers each having a resilient weldrod engaging face such, for instance, as rubber. Shafts 123 and 124 are mounted in ball bearings 127, 128 and 129, 130, as shown, and spur gears 131 and 131' are keyed to the shafts 123 and 124 and intermesh. The spur gear 131 has a double width face and meshes with spur gear 122 so that as shaft 115 is rotated by electric motor 114 the pair of weldrod feeding rollers X rotate to positively feed the electrode or weldrod gripped therebetween and indicated by the letter Z.

Also spur gear 122 engages idler spur gear 132 mounted on stud 133 and which, in turn, meshes with spur gear 134 keyed, as shown, to shaft 135; shaft 135 is mounted on ball bearings 136 and 137 and carries bevel gear pinion 138 meshing with bevel gear pinion 139 keyed to shaft 140 of a pair of shafts, the other of which is 141 and which are mounted in ball bearings 142, 143 and 144, 145, as shown.

The shafts 140 and 141 have keyed thereto meshing spur gears 146 and 147, respectively, and at their outer ends may be mounted the rollers 148 and 149 constituting the pair of weldrod feed rollers Y, each resiliently or yieldingly faced in the same manner as the pair X, but with their axes at right angles to the axes of the rollers constituting the pair X.

The rollers 125 and 126 constituting the pair X and the rollers 148 and 149 constituting the pair Y are each removably secured by suitable nuts or the like to their respective shafts so that when longitudinal seams are being made the rollers 148 and 149 may be readily removed and when circumferential seams are being made the rollers 125 and 126 may be readily removed.

The weldrod Z shown in Figs. 13 and 14 is of the covered type and has formed thereon spaced bumps 300 which extend through the covering and are adapted to be engaged by contact shoes in the casing 301 for conducting the welding current to the rod. It will be observed that I have shown in Fig. 13 the bumps 300 as being at right angles to a plane normal to the axes of the rollers X, the reason being to prevent engagement under pressure of the hard metal bumps with the rubber forming the surface of the rollers, which engagement might cause undue wear of the latter. This arrangement also has the advantage of maintaining the bare contact projections 300 remote from the walls of the welding groove to prevent the formation of an arc between the bare area and the groove wall.

The casing 301 is suspended from the head by means of a swivel joint 302 so that the casing may be turned about the axis of the weldrod to provide for the just described desirable arrangement of the weldrod and roller in welding both longitudinal and circumferential seams. The nut 303 serves to secure the casing 301 in either position.

The contact shoes within the casing 301, but not shown, are held in contact with the bare areas on the weldrod by means of arms 304 which are pivoted at their outer ends in slots 305 at opposite ends of a bracket member 306, each pair of arms being connected by a spring 307 under tension to provide resilient engagement of the shoes with the weldrod. The electrical connection to the casing, and through the shoes to the weldrod, is conveniently made at terminal 308.

From the foregoing it will be apparent that regardless of the angular position of the weldrod due to the movement of handwheels 65 or 111, or the change in horizontal position of the weldrod feeding head due to movement of the handwheel 83, the feeding mechanism of the weldrod will not be thrown out of action.

While I have shown one preferred embodiment of my invention it will be obvious to those skilled in the art that it is not so limited, but is suceptible of various changes and modifications, without departing from the spirit thereof, and I desire, therefore, that only such limitations shall be placed thereupon as are imposed by the prior art or as are specifically set forth in the appended claims.

I claim:

1. In a welding machine, a welding head and support therefor, said head having a weldrod guiding and feeding means carried by said support, means for angularly adjusting the weldrod about axes intersecting substantially in the line of weldrod travel, means for bodily moving the support including the head, and means for moving the head independently of the support.

2. In a welding machine, a welding head and a support therefor, said head having weldrod guiding and feeding means, means including said support for moving said head bodily, and means independent of said support for varying the direction of weldrod feed in intersecting planes along lines having a common intersection.

3. In a welding machine, a welding head comprising relatively movable members, one of which is supported by the other, and means for lineally moving said members relatively, one of said members having weldrod feeding means and each having means for angularly adjusting the direction of weldrod feed.

4. A welding machine including a welding head having separate means for selectively mounting weldrod feeding rollers for rotation in different planes, and means for angularly adjusting said head in said planes.

5. In a welding machine, a welding head having means for supporting a pair of weldrod feeding rollers for rotation about parallel axes located in a given plane, and means for supporting said rollers for rotation about other parallel axes located in a parallel plane, a pair of rollers for support by said means, and means for angularly adjusting the direction of weldrod feed about intersecting axes in an intermediate plane.

6. In a welding machine, a welding head having means for supporting a pair of weldrod feeding rollers for rotation about parallel axes located in a given plane and means for supporting said rollers for rotation about other parallel axes located in a parallel plane, a pair of rollers supported by one of said means, and means angularly adjustable relative to said axes for electrically contacting a weldrod fed by said supported rollers.

7. A welding machine for effecting both longitudinal and transverse welds and comprising a support adapted to carry work to be welded, a welding head carried by the support, a set of rollers, means carried by the head including said rollers providing for the gripping and feeding of a weldrod toward the work when it is desired to weld in a longitudinal direction with respect to the work, a second means carried by the head including said rollers and spaced along the line of weldrod travel from the first named means and providing for the feeding of the weldrod toward the work when it is desired to weld in a transverse direction with respect to the work, said means providing for rotation of said rollers in different planes in the different positions.

8. A welding head including means comprising rollers, at least one of which is driven, adapted to engage a coated weldrod having bared current contact spots therealong longitudinally aligned and at least flush with the surface of the coating, and electrical contact means adapted to resiliently engage said bared spots, said rollers and said electrical contact means being arranged to engage said weldrod at circumferentially spaced locations, said welding head having means selectively providing for rotation of said rollers in transversely related planes and means providing for angular adjustment of the electrical contact means about the line of weldrod travel.

9. In a welding machine, a welding head having weldrod feeding means, a support for said head, means independent of said support for angularly adjusting the direction of weldrod feed about axes intersecting in a point common to the adjusted lines of weldrod travel, and means for adjusting the location of said point relative to said support.

10. In a welding machine, means adapted to support a work plate, a welding head having means for feeding a weldrod relative to said plate, a backing-up member adapted to engage said work plate on the side opposite said head, means for supporting said head including a member supported beyond an edge portion of said plate and adapted to move said head to and from the welding area, and means for moving said welding head and backing-up member in unison to and from said welding area including movement from and to a position clear of said plate, said means for moving including connections between said members extending around a single edge portion of said plate.

11. In a machine for welding a seam interiorly of an open ended shell, a welding head having means for feeding a weldrod toward the inner wall of said shell, an exteriorly supported member adapted to move said head to and from a welding area interiorly of said shell, a backing-up member adapted to engage the outer wall of said shell, and means for moving said welding head and backing-up member in unison longitudinally of said shell to and from the welding area including connections between said members at one end only of said shell.

12. Welding apparatus comprising a support having an extension adapted to project inwardly of an open-end shell from a location outside, a welding head mounted on said extension and having means for feeding a weldrod toward the inner wall of said shell, means for adjusting the angularity of weldrod feed in a plane containing the axis of said shell and in a plane normal to said axis about a center common to the adjusted lines of weldrod travel, means for moving said extension and head bodily for adjusting the position of said feeding means longitudinally of said shell, and means for moving said head independently of said extension for adjusting the position of said feeding means transversely of said shell.

13. In a welding machine, a welding head comprising relatively movable components, one of said components incorporating weldrod feeding means and power means for driving said feeding means, said components having means for angularly adjusting the direction of weldrod feed about intersecting axes, and means for moving said components relatively longitudinally of an axis of adjustment.

14. In a welding machine for utilizing coated weldrods having a metallic core with projections spaced therealong extending through the coating of said weldrod at least to the outer surface thereof to provide bare electrical contact areas, a welding head having means for feeding an electrode of the type described with said bare areas exposed longitudinally of a seam to be welded comprising rollers rotatable about axes extending parallel to said seam for resiliently engaging only coated areas of said electrode at opposite sides circumferentially of said bare projecting areas, and electrical contact shoes for simultaneously resiliently engaging a plurality of longitudinally spaced bare projecting areas.

15. In a welding machine, a welding head having weldrod guiding and feeding means, and means for angularly adjusting the weldrod about axes intersecting substantially in the line of weldrod travel.

16. In a welding machine, means for moving a weldrod in the direction of its length, and means for adjusting said weldrod in intersecting planes about axes which intersect one another in the path of weldrod movement.

17. A welding head having means for feeding a welding electrode, means for rotatably adjusting said head including said feeding means about intersecting axes of rotation, and means for directing said electrode through the point of intersection of said axes of rotation for all adjustments of said head.

18. Welding apparatus comprising a welding electrode, and means for adjusting said electrode in intersecting planes about axes which intersect one another in the longitudinal axis of said welding electrode, said adjusting means also functioning as a holding means for maintaining said welding electrode in a desired adjusted position.

19. Welding apparatus comprising a welding electrode, means for moving said electrode in a substantially straight line, and means for adjusting the direction of said straight line movement about intersecting axes while maintaining the point of intersection of said axes common to all adjusted directions of electrode movement.

20. In a welding machine, means adapted to support a work plate, a welding head having means for feeding a weldrod relative to said plate, a backing-up member adapted to engage said work plate on the side opposite said head, means for supporting said head including a member supported beyond an edge portion of said plate and adapted to move said head to and from the welding area, and means for moving said welding head and backing-up member in unison to and reversely from said welding area, said means for moving including flexible connections between said members extending around a single edge portion of said plate.

JAMES E. TRAINER.